Figure 1:
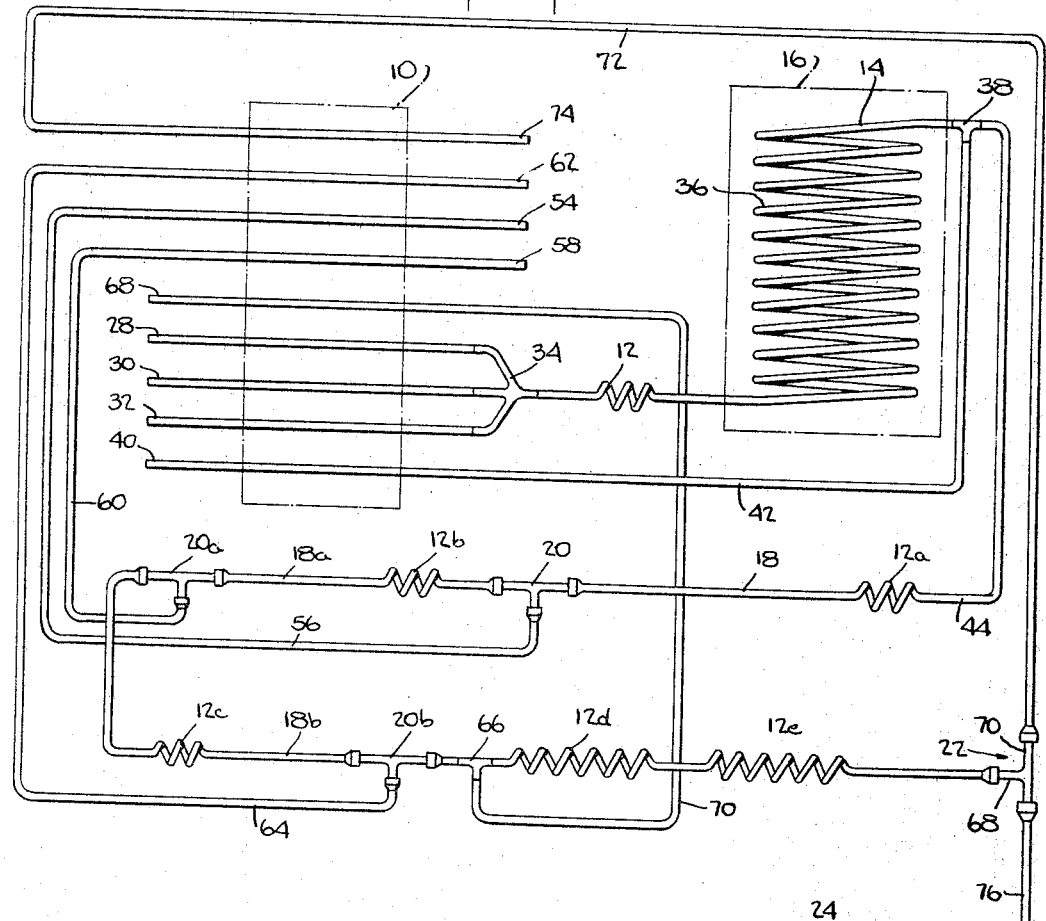

INVENTOR.
WILLIAM J. SMYTHE

ATTORNEY

United States Patent Office 3,334,018
Patented Aug. 1, 1967

3,334,018
MEANS FOR ANALYZING A CONTINUOUS STREAM OF UNIQUE SANGUINEOUS SAMPLES
William J. Smythe, Rye, N.Y., assignor to Technicon Corporation, a corporation of New York
Filed Sept. 5, 1962, Ser. No. 221,570
25 Claims. (Cl. 167—84.5)

This invention relates to the treatment of liquids.

One object of the invention is the provision, in a method and apparatus for treating a liquid stream with a processing liquid to form a separable substance therein, of improved means for separating the substance from the stream to determine the effect of said processing liquid on the first mentioned liquid.

A further object is to provide improved means for separating a substance from a stream containing the substance, concurrently with the flow of the stream.

While useful for other purposes, a presently specific prime object of the invention is to provide an improved method and improved apparatus, of the type indicated, for determining blood types according to the agglutination effect of anti-sera on the red cells of blood samples.

The above and other objects, features and advantages of the invention will be more clearly understood from the following description of the presently preferred embodiment of the invention considered in connection with the accompanying illustrative drawings.

Figure 2:
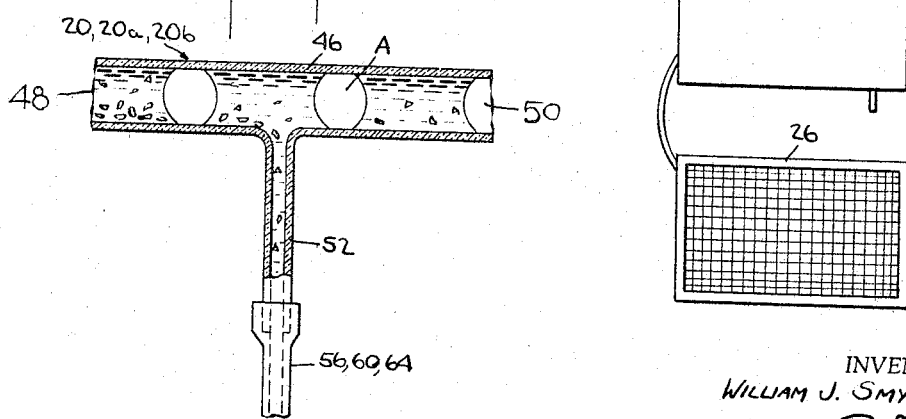

In the drawings:

FIG. 1 is a more-or-less diagrammatic view illustrating the method and apparatus of the present invention; and FIG. 2 is a vertical sectional view, on a greatly enlarged scale, of part of the apparatus of FIG. 1.

According to the invention, briefly described, a liquid sample, in the form of a stream, is treated with a processing liquid during the flow of the sample, and the processing liquid is of a type which forms a substance in the stream which is separable from the stream because of the greater specific gravity of the substance in relation to that of the liquid of the stream. The presence and amount of the formed substance is an indication of the effect of the processing liquid on the liquid sample and, during the flow of the treated stream, at least a portion of the separable substance is removed therefrom, and the stream is thereafter analyzed to provide a measurement of the effect of the processing liquid on the sample.

The invention is especially useful, though not limited, to the determination of blood types. As is well understood, type A blood is responsive to type A anti-serum, type B blood is responsive to type B anti-serum, and type O blood is not responsive to either of these anti-sera, so that when type O blood is treated with either type of anti-sera, no agglutination of the red cells occurs. When either type A or type B blood is treated with its correspondingly identified anti-serum, the red cells of the blood agglutinate. This agglutination reaction of the red blood cells is utilized in the present invention for determining blood types.

More particularly, a series of unique sanguineous samples, such as blood samples, of unknown types, in the form of a stream, is treated with a particular anti-serum, for example type A. The samples which are type A react to the type A anti-serum and agglutinated red cells are formed therein while the type B and O blood samples do not react and therefore no agglutinated red cells are formed. The resulting stream of anti-serum treated blood cells is passed through a series of separating devices which remove the relatively denser agglutinated red cells from the samples. Thereafter the blood samples of the resulting stream are hemolyzed and the stream is colorimetrically analyzed with respect to its hemoglobin content. Those blood samples which are type A will indicate a relatively low hemoglobin content due to the removal of the agglutinated red cells while the blood samples which are not type A will indicate a much higher hemoglobin content since no agglutinates of red cells were formed. In this manner, determinations of blood types can be made accurately and in a relatively simple and expeditious manner.

The invention will now be described in detail with reference to the drawing. The apparatus comprises a proportioning pump 10 of the resiliently compressible tube type, a horizontal helical mixing coil 12 of tubing formed of glass or other suitable material, an axially-vertical helical time-delay and settling-out coil 14 of tubing formed of glass or other material and immersed in a temperature controlled cooling bath 16, another mixing coil 12a identical to coil 12, a horizontal length of settling-out tubing 18, a separating device 20, a third mixing coil 12b identical to coil 12, another length of settling-out tubing 18a identical to tubing 18, another separating device 20a identical to device 20, a fourth mixing coil 12c identical to coil 12, a third length of settling-out tubing 18b, a third separating device 20b, identical to device 20, a pair of mixing coils 12d and 12e, respectively, a gas separator 22, a colorimeter 24 of the flow-through type, and a recorder 26 operable under the control of the colorimeter. The foregoing components of the apparatus are connected in fluid flow communication with each other for the continuous treatment and analysis of one or more blood samples which are supplied, in the form of a stream, to pump tube 28 by a suitable liquid sample supply device, for example the device shown in U.S. Patent No. 3,038,340 issued June 12, 1962. It will be understood that the blood samples are longitudinally spaced from each other in the stream, and are separated from each other by an intervening segment of air, as provided pursuant to the operation of the supply device.

Simultaneously with the supply of the samples to tube 28, air is supplied to pump tube 30 and the anti-serum is supplied to pump tube 32. The fluids join each other at fitting 34 and a segmented stream is formed consisting of longitudinally spaced liquid segments, each containing a portion of the sample and anti-serum, and the liquid segments are separated from each other by an intervening air segment which, as described in U.S. Patent No. 2,797,149 issued June 25, 1957, helps maintain the internal walls of the tubular passages of the apparatus clean to prevent contamination of a sample due to deposits of material from a preceding sample. The segmented stream is transmitted from fitting 34 to the mixing coil 12, which has a relatively short flow path, for mixing the constituents of each liquid segment together. From the mixing coil, the segmented stream flows to the inlet of coil 14, which is at the bottom of the coil. Coil 14 has a series of horizontal convolutions 36 that provide a relatively long flow path for the stream to provide time for the reaction of the blood samples of the type corresponding to the anti-serum. As indicated previously, the reaction results in the agglutination of the red cells in the blood sample and clumps of the red cells are thereby formed in an amount depending upon the effect of the anti-serum on the blood sample. As the stream travels through the horizontal convolutions 36 of the coil, the relatively heavy agglutinated red cells settle at the bottom of the stream. Good results were obtained with a coil 14 having about 20 to 30 convolutions, each having a diameter of 6 inches, to provide a flow path of sufficient length so that it took 20 minutes for the stream to travel through the coil. The coil was immersed in the heating bath 16 which was maintained at 16° C. It will be understood that the foregoing is an illustrative and non-limitative example of a suitable time-delay and settling-out coil.

The reacted stream, containing the settled-out agglutinated red cells, is transmitted from the top of coil 14 to a fitting 38 where it joins a stream of a diluent containing a saline solution supplied to pump tube 40 and transmitted to the fitting via conduit 42. The purpose of the saline solution is to prevent self-hemolysis of the blood samples. The resulting stream, containing the saline solution, is transmitted from fitting 38, through a conduit 44, to the mixing coil 12a which mixes the constituents of each liquid segment together, and any unagglutinated red cells which have settled-out are again suspended in the liquid.

The stream is transmitted from the mixing coil to horizontal tubing 18 which permits additional agglutinated red cells to settle-out, and it will be understood that the length of the tubing is such as to permit settling-out of agglutinated red cells without any appreciable settling-out of the unagglutinated red cells. In other words, the functions of the mixing coils 12a, 12b and 12c, and the coil 14 and tubing 18, 18a and 18b, are to settle-out the agglutinated red cells to facilitate their removal from the stream by the separating devices 20, 20a and 20b, while preventing any settling-out or removal of unagglutinated red cells, it being understood that optimum operation of the apparatus removes all the agglutinated red cells and none of the unagglutinated red cells. However, optimum operation is not necessary for accurate blood type determinations, and good results have been obtained with the horizontal tubes 18, 18a and 18b omitted.

An illustrative and non-limitative example of suitable lengths of settling-out tubing 18, 18a and 18b are 20", 20", and 10", respectively.

From the tubing 18, the stream is transmitted to separating device 20 which, as best seen in FIG. 2, comprises a horizontal tubular passage 46 having an inlet 48 connected to tubing 18 and having an outlet 50 which is connected to the inlet end of mixing coil 12b. A tubular offtake 52 extends vertically downwardly from passage 46, intermediate its inlet and outlet ends. The cross-sectional area of the offtake is relatively small in comparison with the cross-sectional area of passage 46. For example, good separating of a large portion of the agglutinated red cells from the stream has occurred with passage 46 having a 2 mm. inner diameter and with offtake 52 having a 1.0 mm. inner diameter. While the foregoing dimensions are illustrative and non-limitative examples of the relative sizes of passage 46 and offtake 52, it is important that the inner diameter of the offtake be small enough to prevent turbulence in the flow of the fluid in tube 46 which might interfere with the flow of the agglutinated red cells into the offtake and possibly impair or destroy the air segmented pattern of the fluid flow in passage 46. As the stream flows horizontally through the passage, a large portion of the agglutinated red cells, due to their relatively large mass, falls downwardly into offtake 52, and thereby are separated from the stream. The separated red cells can be discarded or collected, as desired or as required. The flow rate of the stream containing the separated red cells is controlled by pump tube 54 which is connected to offtake 52 by a conduit 56. It is to be noted that the segmentation of the stream is not disturbed as the stream flows through the separating device since the air segments A (FIG. 2) are buoyed upwardly as they flow through passage 46 and therefore do not pass into offtake 52.

The resulting segmented stream, with the major portion of the agglutinated red cells removed therefrom, is transmitted to mixing coil 12b where the constituents in each liquid segment of stream are mixed together and the mixed stream is transmitted to the settling-out tube 18a for settling-out of additional agglutinated red cells. The stream is transmitted from the tube to another separating device 20a, wherein another portion of the agglutinated red cells is removed from each segment of the stream, and the offtake of device 20a is connected to its pump tube 58 via conduit 60.

The stream is transmitted from separating device 20a to another mixing coil 12c and therefrom to the settling-out tube 18b where any remaining agglutinated blood cells settles out as the stream flows through the tube. The remaining portion of the agglutinated red cells is removed from the stream by separating device 20b, and the offtake of device 20b is connected to its pump tube 62 via conduit 64. As indicated above, transmitting the stream through a series of mixing coils, settling-out tubes and separating devices results in the removal of all the agglutinated red cells from the stream with little removal of unagglutinated red cells, and thereby results in extremely sensitive and accurate determinations. The resulting stream is transmitted from device 20b to a fitting 66 where it joins a stream of water, which is supplied to the fitting, via pump tube 68 and conduit 70, for hemolyzing the red cells of the stream.

The stream is transmitted from fitting 52 to mixing coils 12d and 12e, respectively, which provide sufficiently long flow paths for completion of the hemolysis reaction. The hemolyzed stream is transmitted to the gas separator 22 for removing the air segments A from the stream to form a consolidated liquid stream which is transmitted to the flow cell (not shown) of colorimeter 24 for colorimetric examination of the liquid with respect to its hemoglobin content, as determined by the intensity of the red color of the stream, to provide a measurement indicative of the effect of the anti-serum on the blood samples and thereby provide a determination of the blood types of the samples. The gas separator comprises a horizontal tubular arm 68, which is connected to the outlet of coil 12e, and a vertical tubular arm 70, which has its upper end connected to a conduit 72 that is connected to suction pump tube 74, and which has its lower end connected to conduit 76, the latter being connected to the flow cell of the colorimeter. Due to the vertical arm 70 of the separator 22 and the aspirating action of pump tube 74, the air segments A rise in the arm to separate from the liquid segments of the stream, and are removed from the device 22 through conduit 72. The liquid segments of the stream join each other as they flow downwardly through arm 70 so that a consolidated liquid stream is transmitted through conduit 76 to the flow cell of the colorimeter. The results of the colorimetric examination of the stream are recorded on the recorder 26.

Proportioning pump 10 may be of any known type but is preferably of the type shown and described in U.S. Patent No. 2,935,028 issued May 3, 1960. Briefly described, the pump comprises a series of resiliently compressible pump tubes which are engaged and closed by a series of longitudinally movable rollers, in succession, and progressively along their lengths, for propelling the various fluids through the pump tubes and different rates of flow of the fluids are obtained by providing different internal diameters for the pump tubes, respectively. Colorimeter 24 and recorder 26 are well known devices and since they do not, per se, form part of the present invention, further description of these devices is unnecessary.

An illustrative and non-limitative example of the volumetric quantities of the various fluids, as determined by the pumping rates through the corresponding pump tubes, are as follows:

| Pump tubes | Rate of flow (ml./min.) |
| --- | --- |
| 28 | 0.3 (blood). |
| 30 | 0.3 (segmentizing air). |
| 32 | 0.3 (anti-serum). |
| 40 | 2.0 (diluent containing saline). |
| 54 | 0.6 (liquid containing agglutinated cells). |
| 58 | 0.6 (liquid containing agglutinated cells). |
| 62 | 0.6 (liquid containing agglutinated cells). |
| 68 | 2.0 (water). |

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Apparatus for analyzing a plurality of unique fluid samples, comprising: first means for supplying, under positive pressure, the samples seriatim as segments in a continuous stream, each sample segment being spaced from a succeeding sample segment and compartmentalized by a gas segment, at least some of said sample segments containing a precipitant; a substantially horizontal conduit coupled to said first means for settling any precipitant in each sample segment into the lower portion of such sample segment, as the sample segments pass through said conduit in a continuous stream; an off-take orifice in the lower portion of said conduit, said orifice having a cross-sectional area smaller than the cross-sectional area of said conduit; and withdrawal means coupled to said orifice for removing, under negative pressure, the lower portion of the stream containing most of the precipitant.

2. Apparatus for analyzing a plurality of unique fluid samples, comprising: first means for supplying, under positive pressure, the samples seriatim as a segments in a continuous stream, each sample segment being spaced from a succeeding sample segment and compartmentalized by a gas segment, at least some of said sample segments containing a precipitant; a substantially horizontal and extensively elongated conduit having its ingress coupled to said first means for settling any precipitant in each sample segment into the lower portion of such sample segment, as the sample segments pass through said conduit in a continuous stream; an off-take orifice in the lower portion of said conduit adjacent its egress, said orifice having a cross-sectional area smaller than the cross-sectional area of said conduit; and withdrawal means coupled to said orifice for removing, under negative pressure, the lower portion of the stream containing most of the precipitant.

3. Apparatus for analyzing a plurality of unique fluid samples, comprising: first means for supplying, under positive pressure, the samples seriatim as segments in a continuous stream, each sample segment being spaced from a succeeding sample segment and compartmentalized by a gas segment, at least some of said sample segments containing a precipitant; a substantially horizontal and extensively elongated conduit having its ingress coupled to said first means for settling any precipitant in each sample segment into the lower portion of such sample segment, as the sample segments pass through said conduit in a continuous stream; an off-take orifice in the lower potrion of said conduit, said orifice having a cross-sectional area smaller than the cross-sectional area of said conduit; and withdrawal means coupled to said orifice for removing, under negative pressure, the lower portion of the stream containing most of the precipitant; wherein the lower portion of said conduit supports the settled precipitate in each sample segment while the succeeding gas segment maintains the settled precipitate within the preceding sample segment, and the settled precipitate in such sample segment falls through said orifice as such sample segment passes over said orifice.

4. Apparatus for analyzing a plurality of unique fluid samples, comprising: first means for supplying, under positive pressure, the samples seriatim as segments in a continuous stream, each sample segment being spaced from a succeeding sample segment and compartmentalized by a gas segment, at least some of said sample segments containing a precipitant; a substantially horizontal and extensively elongated conduit having its ingress coupled to said first means for settling any precipitant in each sample segment into the lower portion of such sample segment, as the sample segments pass through said conduit in a continuous stream; a plurality of off-take orifices seriatim in the lower portion of said conduit adjacent its egress, each said orifice having a cross-sectional area no greater than one-half the cross-sectional area of said conduit; and withdrawal means coupled to each said orifice for removing, under negative pressure, the lower portion of the stream containing most of the precipitant.

5. Apparatus for analyzing a plurality of unique fluid samples with respect to an ingredient of interest, comprising: first means for supplying, under positive pressure, the samples seriatim as segments in a continuous stream, each sample segment being spaced from a succeeding sample segment by an additional fluid segment; second means for supplying under positive pressure a precipitant forming reagent as a continuous stream; mixing means coupled to said first and second means for receiving and intermixing the streams, for precipitating the ingredient of interest in each sample segment; a substantially horizontal conduit coupled to said mixing means for settling the precipitant in each sample segment to the lower portion of such sample segment, as the sample segments pass through said conduit in a continuous stream; an off-take orifice in the lower portion of said conduit, said orifice having a cross-sectional area smaller than the cross-sectional area of said conduit; and withdrawal means coupled to said orifice for removing, under negative pressure, the lower portion of the stream containing most of the precipitant.

6. Apparatus for analyzing a plurality of unique blood samples, comprising: first means for supplying the samples seriatim as segments in a continuous stream, each sample segment being spaced from a succeeding sample segment by a buffer fluid segment; second means for supplying a reagent as a continuous stream which has a precipitating effect on a substance of interest in blood; mixing means coupled to said first and second means for receiving and intermixing the streams, for precipitating the substance of interest; a substantially horizontal conduit coupled to said mixing means for settling precipitant in each sample segment to the lower portion of such sample segment, as the sample segments pass through the conduit in a continuous stream; an off-take orifice in the lower portion of said conduit to trap and remove the precipitate from the continuous stream, said orifice having a cross-sectional area smaller than the cross-sectional area of said conduit; third means coupled to said conduit for receiving the continuous stream and for reacting each sample segment to provide a color having a density responsive to presence of the substance of interest; and colorimetric means coupled to said third means for receiving the continuous stream and for measuring the color density of each of the sample segments.

7. Apparatus for blood typing a plurality of unique blood samples, comprising: first means for supplying the samples seriatim as segments in a continuous stream, each sample segment being spaced from a succeeding sample segment by a gas segment; second means for supplying an anti-serum as a continuous stream; mixing means coupled to said first and second means for receiving and intermixing the streams, for agglutinating red cells from the sample segments; a substantially horizontal conduit coupled to said mixing means for settling agglutinated red cells in each sample segment to the lower portion of such sample segment, as the sample segments pass through the conduit in a continuous stream; an off-take orifice in the lower portion of said conduit to trap and remove the agglutinated red cells from the continuous stream, said orifice having a cross-sectional area smaller than the cross-sectional area of said conduit; third means coupled to said conduit for receiving the continuous stream and for hemolyzing red cells therein; and colorimetric means coupled to said third means for receiving the continuous stream and for measuring the color density of each of the sample segments.

8. Apparatus for blood typing a plurality of unique blood samples, comprising: first means for supplying, under positive pressure, the samples seriatim as segments in a continuous stream, each sample segment being spaced from a succeeding sample segment by a gas segment; second means for supplying, under positive pressure, a reagent which has a precipitating effect on a substance of interest in blood as a continuous stream; fixing means coupled to said first and second means, for receiving and intermixing the streams for precipitating the substance of interest from the sample segments; a substantially horizontal conduit coupled to said mixing means for settling precipitant in each sample segment to the lower portion of such sample segment as the sample segments pass through said conduit in a continuous stream; an off-take orifice in the lower portion of said conduit for trapping precipitant from the continuous stream, said orifice having a cross-sectional area smaller than the cross-sectional area of said conduit; sump means coupled to said orifice for removing, under negative pressure, the trapped precipitant; third means coupled to said conduit for receiving the continuous stream and for reacting each sample segment to provide a color having a density responsive to the presence of the substance of interest; and colorimetric means coupled to said third means for receiving the continuous stream and for measuring the color density of each of the sample segments.

9. Apparatus for blood typing a plurality of unique blood samples, comprising: first means for supplying, under positive pressure, the samples seriatim as segments in a continuous stream, each sample segment being spaced from a succeeding sample segment by a gas segment; second means for supplying, under positive pressure, a reagent which has a precipitating effect on a substance of interest in blood as a continuous stream; mixing means coupled to said first and second means, for receiving and intermixing the streams for precipitating the substance of interest from the sample segments; a substantially horizontal conduit coupled to said mixing means for settling precipitant in each sample segment to the lower portion of such sample segment as the sample segments pass through said conduit in a continuous stream; an off-take orifice in the lower portion of said conduit for trapping precipitant from the continuous stream, said orifice having a cross-sectional area smaller than the cross-sectional area of said conduit; sump means coupled to said orifice for removing, under negative pressure, the trapped precipitant; third means coupled to said conduit for receiving the continuous stream and for reacting each sample segment to provide a color having a density responsive to the presence of the substance of interest; vent means coupled to said third means for receiving the continuous stream and for removing the gas segments therefrom; and colorimetric means coupled to said vent means for receiving the continuous stream and for measuring the color density of each of the sample segments.

10. Apparatus for blood typing a plurality of unique blood samples, comprising: first means for supplying, under positive pressure, the samples seriatim as segments in a continuous stream, each sample segment being spaced from a succeeding sample segment by a gas segment; second means for supplying, under positive pressure, an antiserum as a continuous stream; mixing means coupled to said first and second means for receiving and intermixing the streams, for agglutinating red cells from the sample segments; a substantially horizontal conduit coupled to said mixing means for settling agglutinated red cells in each sample segment to the lower portion of such sample segment, as the sample segments pass through said conduit in a continuous stream; an off-take orifice in the lower portion of said conduit for trapping agglutinated red cells from the continuous stream, said orifice having a cross-sectional area smaller than the cross-sectional area of said conduit; sump means coupled to said orifice for removing, under negative pressure, the trapped agglutinated red cells; third means coupled to said conduit for receiving the continuous stream and for hemolyzing red cells therein; and colorimetric means coupled to said third means for receiving the continuous stream and for measuring the color density of each of the sample segments.

11. Apparatus for blood typing a plurality of unique blood samples, comprising: first means for supplying, under positive pressure, the samples seriatim as segments in a continuous stream, each sample segment being spaced from a succeeding sample segment by a gas segment; second means for supplying, under positive pressure, an antiserum as a continuous stream; mixing means coupled to said first and second means for receiving and intermixing the streams, for agglutinating red cells from the sample segments; a substantially horizontal conduit coupled to said mixing means for settling agglutinated red cells in each sample segment to the lower portion of such sample segment, as the sample segments pass through said conduit in a continuous stream; an off-take orifice in the lower portion of said conduit for trapping agglutinated red cells from the continuous stream, said orifice having a cross-sectional area smaller than the cross-sectional area of said conduit; sump means coupled to said orifice for removing, under negative pressure, the trapped agglutinated red cells; third means coupled to said conduit for receiving the continuous stream and for hemolyzing red cells therein; and means coupled to said third means for receiving the continuous stream and for removing the gas segments therefrom; and colorimetric means coupled to said vent means for receiving the continuous stream and for measuring the color density of each of the sample segments.

12. Apparatus for blood typing a plurality of unique blood samples, comprising: first means for supplying, under positive pressure, the samples seriatim as segments in a continuous stream, each sample segment being spaced from a succeeding sample segment by a gas segment; second means for supplying, under positive pressure, an antiserum as a continuous stream; mixing means coupled to said first and second means for receiving and intermixing the streams, for agglutinating red cells from the sample segments; a substantially horizontal conduit coupled to said mixing means for settling agglutinated red cells in each sample segment to the lower portion of such sample segment, as the sample segments pass through said conduit in a continuous stream; an off-take orifice in the lower portion of said conduit for trapping agglutinated red cells; third means coupled to said conduit for receiving the continuous stream and for hemolyzing red cells therein; and colorimetric means coupled to said third means for receiving the continuous stream and for measuring the color density of each of the sample segments.

13. Apparatus for blood typing a plurality of unique blood samples, comprising: first means for supplying, under positive pressure, the samples seriatim as segments in a continuous stream, each sample segment being spaced from a succeeding sample segment by a gas segment; second means for supplying, under positive pressure, a reagent which has a precipitating effect on a substance of interest in blood as a continuous stream; mixing means coupled to said first and second means, for receiving and intermixing the streams for precipitating the substance of interest from the sample segments; a substantially horizontal conduit coupled to said mixing means for settling precipitant in each sample segment to the lower portion of such sample segment as the sample segments pass through said conduit in a continuous stream; an off-take orifice in the lower portion of said conduit for trapping precipitant from the continuous stream, said orifice having a cross-sectional area smaller than the cross-sectional area of said conduit; sump means coupled to said orifice for removing, under negative pressure, the trapped precipitant; third means coupled to said conduit for receiving the continuous stream and for reacting each sample segment to provide a color having a density responsive to the presence of the substance of interest; and colorimetric means coupled to said third means for receiving the continuous stream and for measuring the color density of each of the sample segments.

14. Apparatus for blood typing a plurality of unique blood samples, comprising: first means for supplying, under positive pressure, the samples seriatim as segments in a continuous stream, each sample segment being spaced from a succeeding sample segment by a gas segment; second means for supplying, under positive pressure, an antiserum as a continuous stream; mixing means coupled to said first and second means for receiving and intermixing the streams, for agglutinating red cells from the sample segments; a substantially horizontal conduit coupled to said mixing means for settling agglutinated red cells in each sample segment to the lower portion of such sample segment, as the sample segments pass through said conduit in a continuous stream; an off-take orifice in the lower portion of said conduit for trapping agglutinated red cells from the continuous stream, said orifice having a cross-sectional area smaller than the cross-sectional area of said conduit; sump means coupled to said orifice for removing, under negative pressure, the lower portion of the stream containing most of the agglutinated red cells; third means coupled to said conduit for receiving the continuous stream and for reacting each sample segment to provide a color having a density responsive to the presence of the substance of interest; vent means coupled to said third means for receiving the continuous stream and for removing the gas segments therefrom; and colorimetric means coupled to said vent means for receiving the continuous stream and for measuring the color density of each of the sample segments.

15. A method of determining which if any of a plurality of unique blood samples are of a given blood type, comprising: providing the unique samples seriatim as a continuous stream of sample segments in a conduit, each spaced from the succeeding sample segment by a buffer liquid segment; mixing the sample stream with a continuous stream of a given antiserum to agglutinate any given serum positive red cells in each sample segment; settling the agglutinated red cells in each sample segment in the continuous stream to the lower portion of such sample segment; dividing the continuous stream of samples into a lower portion continuous stream containing at least most of the agglutinated red cells and an upper portion continuous stream containing at least most of the nonagglutinated red cells; hemolyzing the red cells in each sample segment of the upper continuous stream to provide each sample segment with a color having a density responsive to the quantity of red cells in such sample segment; and measuring the color density of each sample segment in the upper continuous stream.

16. A method of determining which if any of a plurality of unique sanguineous samples are of a given blood type, comprising: transmitting the unique samples seriatim as a continuous stream of samples in a conduit; mixing the samples with a reagent stream which provides an agglutination reaction with sanguineous samples of said given blood type; settling any agglutinated material produced by such reaction in each sample in the continuous stream in a conduit to the lower portion of each such sample; whereby the continuous stream of samples has a lower portion containing at least most of any agglutinated material and an upper portion containing a uniform share of any nonagglutinated material; removing the lower portion from the continuous stream of samples; and conveying one of said portions to an analysis means.

17. A method of determining which if any of a plurality of unique sanguineous samples are of a given blood type, comprising: transmitting the unique samples seriatim as a continuous stream of samples in a conduit; each spaced from the succeeding sample by an isolating fluid segment; mixing the samples with a reagent stream which provides an agglutination reaction with sanguineous samples of said given blood type; settling any agglutinated material produced by such reaction in each sample in the continuous stream in a conduit to the lower portion of each such sample; whereby the continuous stream of samples has a lower portion containing at least most of any agglutinated material and an upper portion containing a uniform share of any nonagglutinated material; removing the lower portion from the continuous stream of samples; and conveying one of said portions to an analysis means.

18. A method of determining which if any of a plurality of unique sanguineous samples are of a given blood type, comprising: transmitting the unique samples seriatim as a continuous stream of samples in a conduit; mixing the samples with a reagent stream which provides an agglutination reaction involving red cells with sanguineous samples of said given blood type; settling any agglutinated red cells produced by such reaction in each sample in the continuous stream in a conduit to the lower portion of each such sample; whereby the continuous stream of samples has a lower portion containing at least most of any agglutinated red cells and an upper portion containing a uniform share of any nonagglutinated red cells; removing the lower portion from the continuous stream of samples; and conveying one of said portions to an analysis means.

19. A method of determining which if any of a plurality of unique sanguineous samples are of a given blood type, comprising: transmitting the unique samples seriatim as a continuous stream of samples in a conduit; each spaced from the succeeding sample by an isolating fluid segment; mixing the samples with a reagent stream which provides an agglutination reaction involving red cells with sanguineous samples of said given blood type; settling any agglutinated red cells produced by such reaction in each sample in the continuous stream in a conduit to the lower portion of each such sample; whereby the continuous stream of samples has a lower portion containing at least most of any agglutinated red cells and an upper portion containing a uniform share of any nonagglutinated red cells; removing the lower portion from the continuous stream of samples; and conveying one of said portions to an analysis means.

20. A method of determining which if any of a plurality of unique sanguineous samples are of a given blood type, comprising: transmitting the unique samples seriatim as a continuous stream of samples in a conduit; mixing the stream of samples with a reagent stream which provides an agglutination reaction with sanguineous samples of said given blood type; settling agglutinated material produced by such reaction in each sample in the continuous stream in a conduit to the lower portion of such sample; whereby the continuous stream of samples has a lower portion containing at least most of the agglutinated material and an upper portion containing at least most of the nonagglutinated material; removing the lower portion from the continuous stream of samples; mixing the continuous stream with a lysing reagent whereby the nonagglutinated material in each sample of the continuous stream provides each sample segment with a color having a density responsive to the quantity nonagglutinated material in such sample; and measuring the color density of each sample in the continuous stream.

21. A method of determining which if any of a plurality of unique sanguineous samples are of a given blood type, comprising: transmitting the unique samples seriatim as a continuous stream of samples in a conduit; each spaced from the succeeding sample by an isolating fluid segment; mixing the stream of samples with a reagent stream which provides an agglutination reaction with sanguineous samples of said given blood type; settling agglutinated material produced by such reaction in each sample in the continuous stream in a conduit to the lower portion of such sample; whereby the continuous stream of samples has a lower portion containing at least most of the agglutinated material and an upper portion containing at least most of the nonagglutinated material; removing the lower portion from the continuous stream of samples; mixing the continuous stream with a lysing reagent whereby the nonagglutinated material in each sample of the continuous stream provides each sample segment with a color having a density responsive to the quantity nonagglutinated material in such sample; and measuring the color density of each sample in the continuous stream.

22. A method of determining which if any of a plurality of unique sanguineous samples are of a given blood type, comprising: transmitting the unique samples seriatim as a continuous stream of samples in a conduit; mixing the stream of samples with areagent stream of a given sanguineous material which provides an agglutination reaction with sanguineous samples of said given blood type; settling agglutinated material produced by such reaction in each sample in the continuous stream in a conduit to the lower portion of such sample; whereby the continuous stream of samples has a lower portion containing at least most of the agglutinated material and an upper portion containing at least most of the nonagglutinated material removing the lower portion from the continuous stream of samples; mixing the continuous stream with a lysing reagent whereby the nonagglutinated material in each sample of the continuous stream provides each sample segment with a color having a density responsive to the quantity nonagglutinated material in such sample; and measuring the color density of each sample in the continuous stream.

23. A method of determining which if any of a plurality of unique sanguineous samples are of a given blood type, comprising: transmitting the unique samples seriatim as a continuous stream of samples in a conduit; each spaced from the succeeding sample by an isolating fluid segment; mixing the stream of samples with a reagent stream of a given sanguineous material which provides an agglutination reaction with sanguineous samples of said given blood type; settling agglutinated material produced by such reaction in each sample in the continuous stream in a conduit to the lower portion of such sample; whereby the continuous stream of samples has a lower portion containing at least most of the agglutinated material and an upper portion containing at least most of the nonagglutinated material; removing the lower portion from the continuous stream of samples; mixing the continuous stream with a lysing reagent whereby the nonagglutinated material in each sample of the continuous stream provides each sample segment with a color having a density responsive to the quantity nonagglutinated material in such sample; and measuring the color density of each sample in the continuous stream.

24. A method of determining which if any of a plurality of unique sanguineous samples are of a given blood type, comprising: transmitting the unique samples seriatim as a continuous stream of samples in a conduit; mixing the stream of samples with a reagent stream of a given sanguineous material which provides an agglutination reaction involving red blood cells with sanguineous samples of said given blood type; settling agglutinated red cells from such reaction in each sample in the continuous stream in a conduit to the lower portion of such sample whereby the continuous stream of samples has a lower portion containing at least most of the agglutinated red cells and an upper portion containing most of any nonagglutinated red cells; removing the lower portion from the continuous stream of samples; mixing the continuous stream with a lysing reagent whereby the nonagglutinated cells in each sample provide each sample with a color having a density responsive to the quantity of red cells in such sample; and measuring the color density of each sample in the continuous stream.

25. A method of determining which if any of a plurality of unique sanguineous samples are of a given blood type, comprising: transmitting the unique samples seriatim as a continuous stream of samples in a conduit; each spaced from the succeeding sample by an isolating fluid segment; mixing the stream of samples with a reagent stream of a given sanguineous material which provides an agglutination reaction involving red blood cells with sanguineous samples of said given blood type; settling agglutinated red cells from such reaction in each sample in the continuous stream in a conduit to the lower portion of such sample whereby the continuous stream of samples has a lower portion containing at least most of the agglutinated red cells and an upper portion containing most of any nonagglutinated red cells; removing the lower portion from the continuous stream of samples; mixing the continuous stream with a lysing reagent whereby the nonagglutinated cells in each sample provide each sample with a color having a density responsive to the quantity of red cells in such sample; and measuring the color density of each sample in the continuous stream.

References Cited
UNITED STATES PATENTS

| | | | |
|---|---|---|---|
| 1,355,073 | 10/1920 | Brenkert | 210—433 |
| 2,770,572 | 11/1956 | Eldon | 167—78 |
| 3,047,367 | 7/1962 | Kessler | 23—253 |
| 3,098,719 | 7/1963 | Skeggs | 23—253 |

ALBERT T. MEYERS, *Primary Examiner.*

D. E. GANTZ, *Examiner.*

ANNA P. FAGELSON, *Assistant Examiner.*